Patented Sept. 6, 1927.

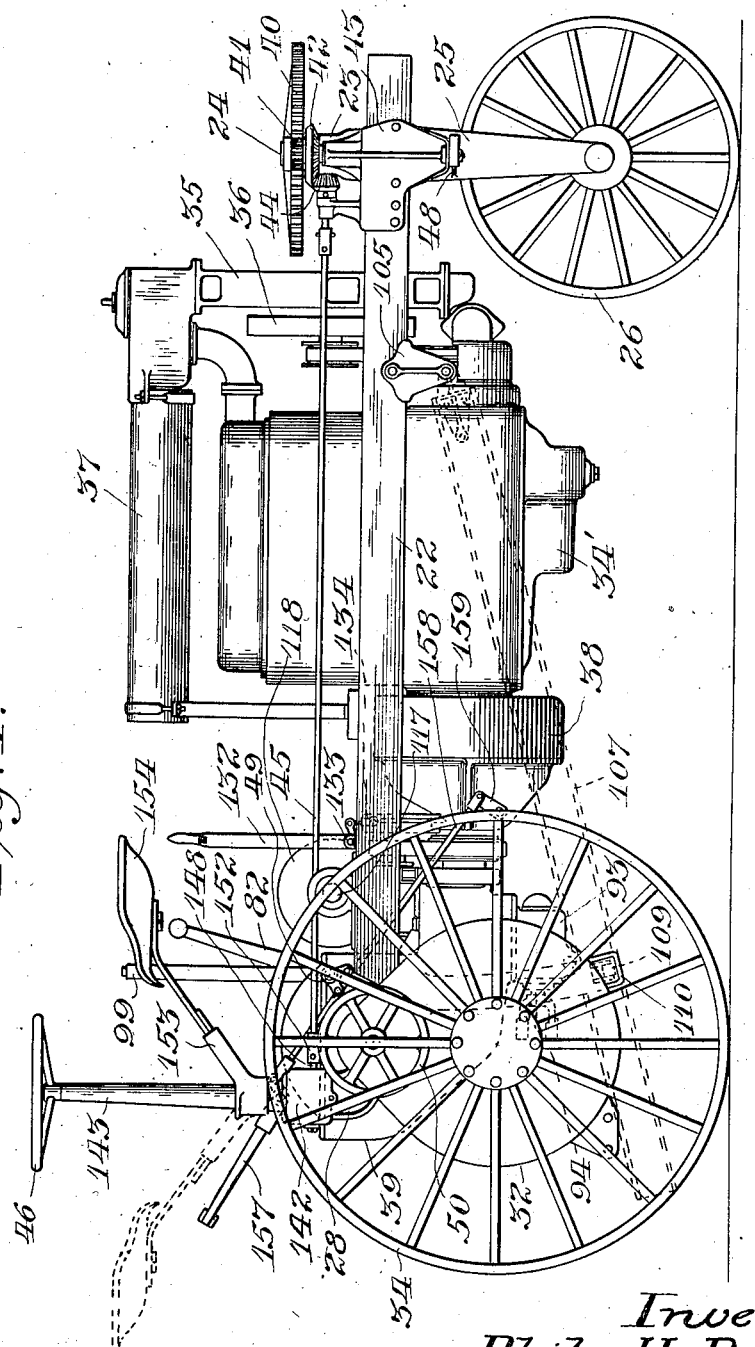

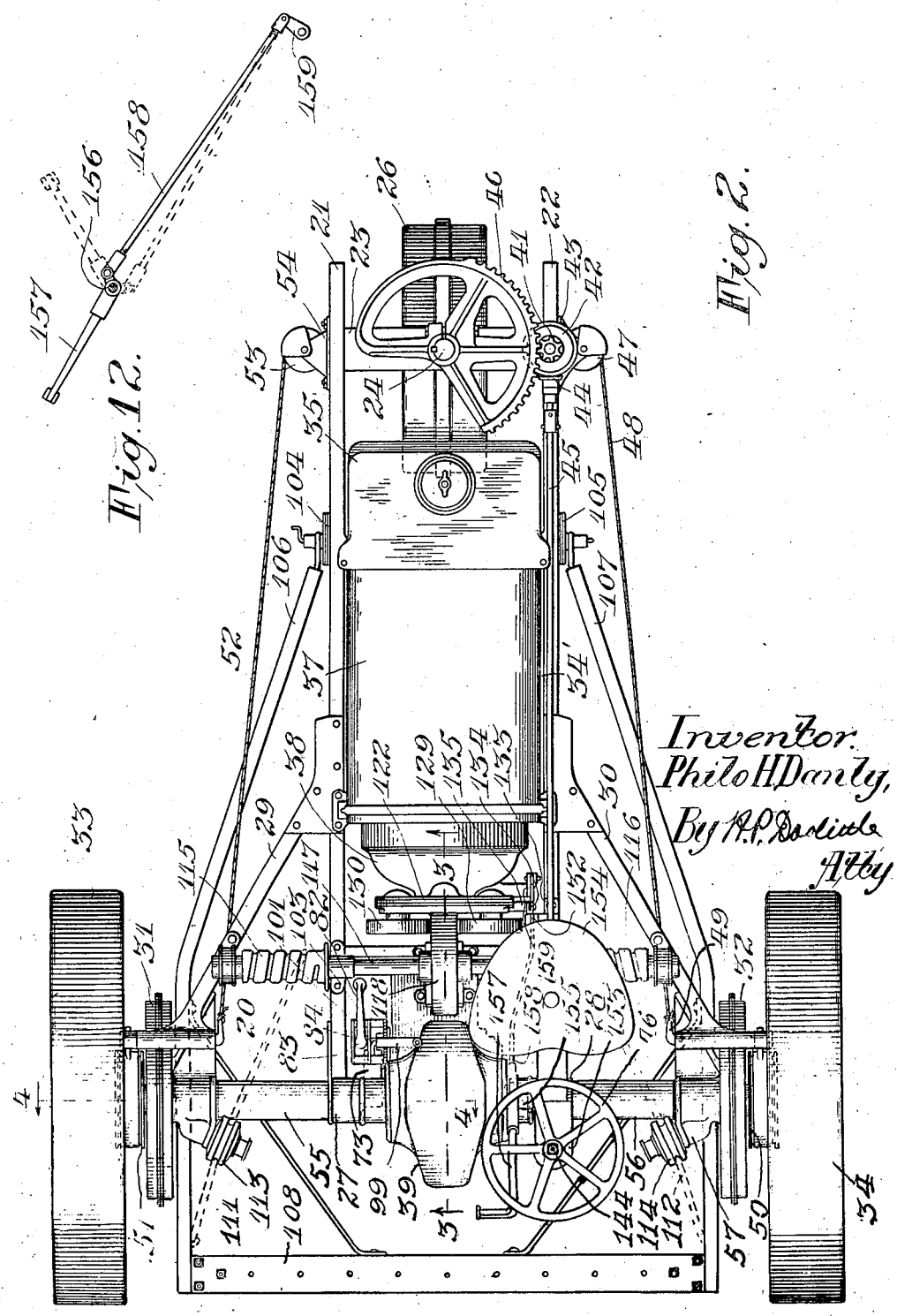

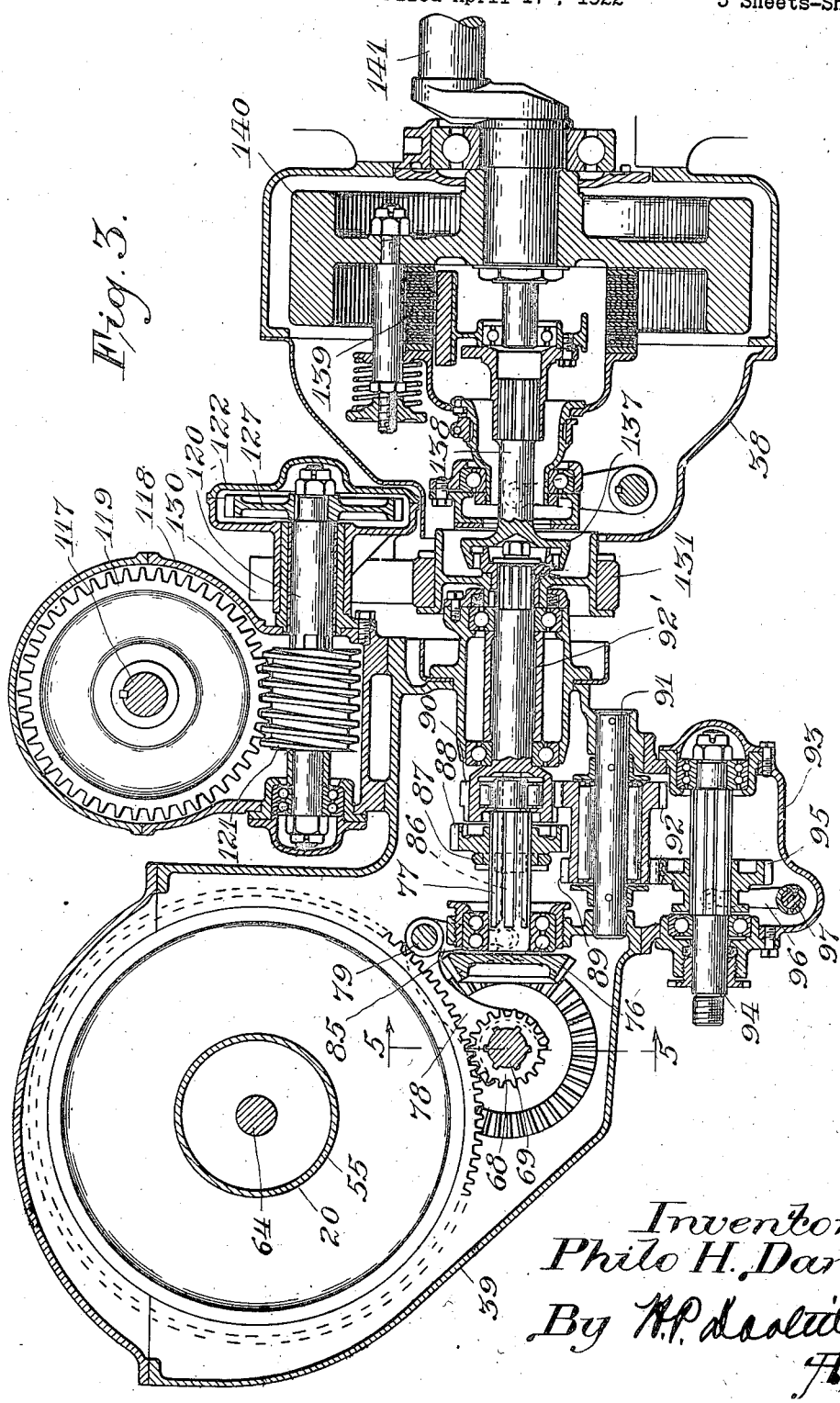

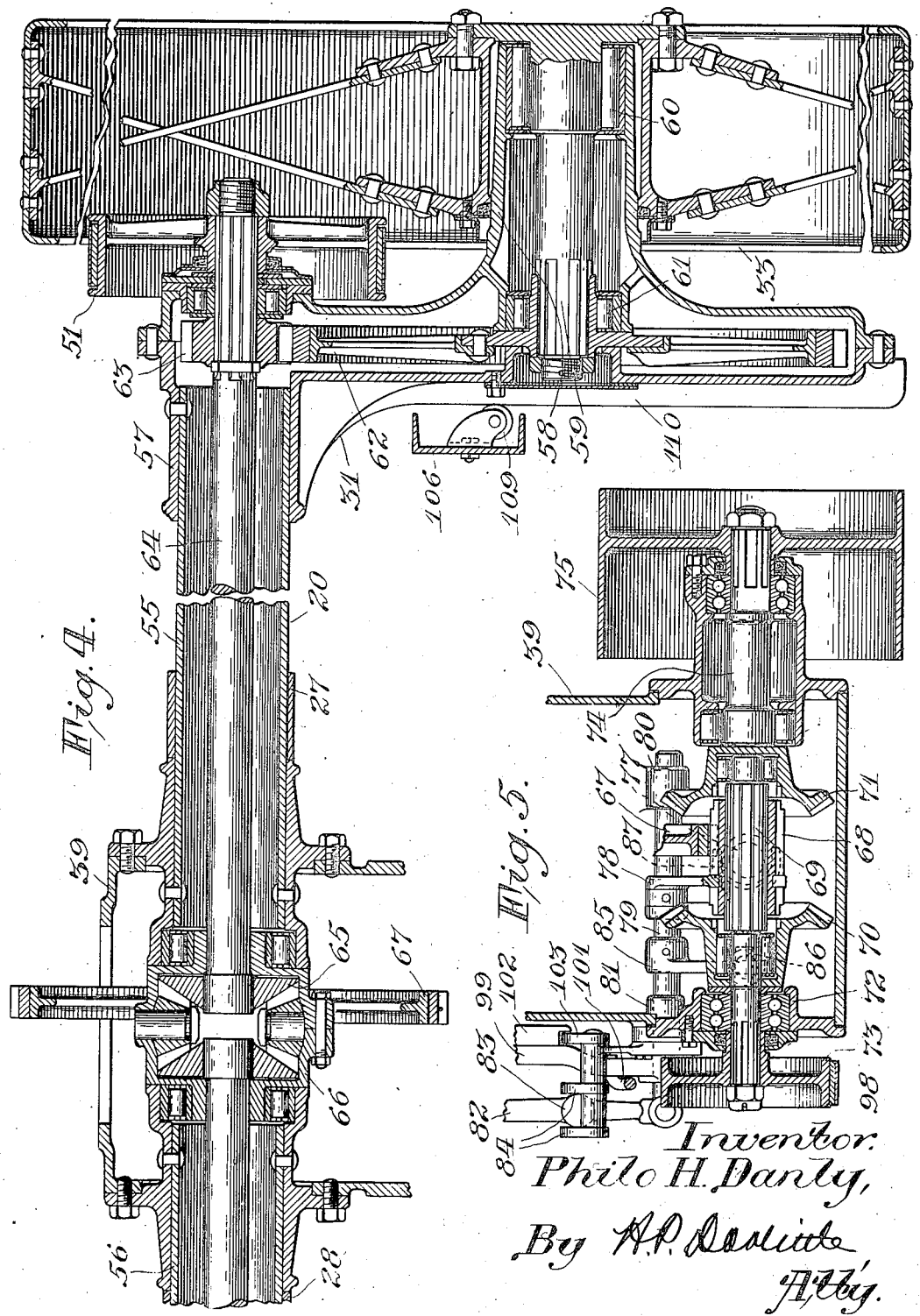

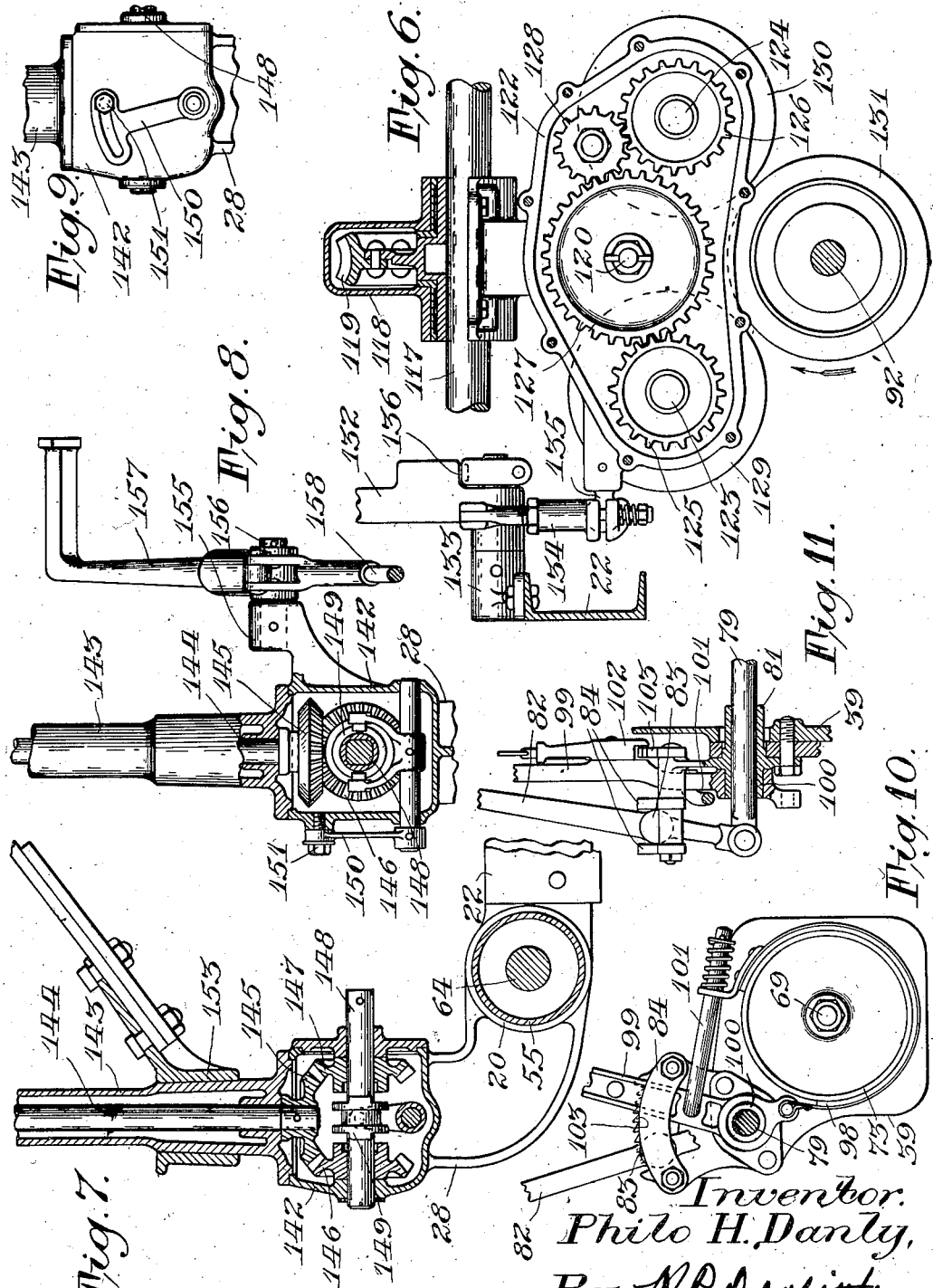

1,641,802

UNITED STATES PATENT OFFICE.

PHILO H. DANLY, OF CHICAGO, ILLINOIS, ASSIGNOR TO INTERNATIONAL HARVESTER COMPANY, OF CHICAGO, ILLINOIS, A CORPORATION OF NEW JERSEY.

TRACTOR.

Application filed April 17, 1922. Serial No. 553,430.

My invention relates to tractors and particularly to improvements in reversible tractors of the type adapted for use with a wide range of agricultural implements and for general power purposes, the invention pertaining more specifically to improvements in the tractor shown and claimed in the co-pending joint application of Edward A. Johnston and myself, filed November 12, 1921, Serial No. 514,516.

Among the objects of my invention are to improve and simplify the construction of the tractor and to render it more stable by lowering its center of gravity.

Other objects are to improve and simplify the tractor frame, the steering means, the implement adjusting mechanism and the clutch operating means.

The above and other objects are attained by the embodiment of my invention illustrated in the accompanying drawings in which—

Fig. 1 is a side elevation;

Fig. 2 is a plan of my improved tractor;

Fig. 3 is a sectional view taken substantially on the line 3—3 of Fig. 2 showing the clutch, transmission, differential, implement adjusting means and power take-off;

Fig. 4 is a section through the main axle and driving wheel, the section being taken substantially on the line 4—4 of Fig. 2;

Fig. 5 is a section taken on the line 5—5 of Fig. 3 showing the brake, belt pulley, and forward and reverse driving means;

Fig. 6 is a detail view, partly in section and partly broken away, of the mechanism for driving the implement adjusting shaft;

Figs. 7, 8 and 9 are details of the steering post assembly;

Figs. 10 and 11 are details of the brake and transmission gear shift levers; and Fig. 12 is a detail of the reversible clutch pedal.

Referring to Figs. 1 and 2, my improved tractor comprises a frame having a main axle or casing 20 extending transversely of the tractor and to which one end of each of the parallel channels 21, 22 is connected at points adjacent either side of its center, said channels forming a narrow longitudinally extending main frame. The other ends of the channels are secured to opposite ends of a cross member or bolster 23 in which the vertical shaft 24 of the yoke 25 is rotatably mounted. The yoke 25 is forked at its lower end and provides bearings for a steering wheel 26. The side bar 21 is secured to a collar 27 on the main axle while the bar 22 is similarly secured to a bracket 28 which also supports the seat, steering post and clutch pedal as will be described later. Diagonal brace members 29, 30 may be connected at one end to the parallel frame members 21, 22 intermediate their ends and at their opposite ends secured to depending castings or gear casings 31, 32 forming part of the main axle. Each of the casings 31, 32 has a laterally projecting hollow stub axle on which the driving wheels 33, 34 are rotatably mounted as will be described later in detail.

The longitudinal frame members 21, 22 provide a support for an internal combustion engine 34' having the usual radiator 35, cooling fan 36 and fuel tank 37. A clutch housing 38 is secured to the rear end of the engine and provides means for connecting the engine crank shaft with the transmission mechanism in the casing 39 which houses both the transmission mechanism and the differential mounted on the main axle. A sector 40 is keyed to the upper end of shaft 24 and meshes with a pinion 41 secured to or formed integral with a bevel gear 42 rotatably mounted on a bracket 43 secured to the channel 22. The bevel gear 42 meshes with bevel pinion 44 secured to a horizontal shaft 45 operatively connected with the steering wheel 46 for steering the tractor. The bracket 43 supports a sheave 47 over which a cable 48 runs, one end of the cable being secured to one side of the yoke 25, the other end being secured to a lever 49 forming part of a band brake 50 associated with the drive wheel 34 to assist in steering the tractor when it is desired to make a short quick turn. A similar brake 51 cooperates with the drive wheel 33 and has a cable 52 passing over a sheave 53 secured to a bracket 54 on the frame member 21, one end of the cable 52 being secured to one side of the yoke 25. By means of the brake drums 50, 51 a differential driving movement of the traction wheels 33, 34 is secured for steering purposes as is more fully shown and described in the co-pending application above referred to and per se forms no part of the present invention.

Referring particularly to Figs. 2 and 4, the main axle or casing, which may be termed an arched axle since its central portion is raised above the ends so as to afford clearance for the tractor when it is used for cultivating growing crops, comprises a portion of the differential casing 39 to which is secured oppositely extending hollow struts 55, 56 to the outer ends of which the gear casings 31, 32 are respectively secured. The two ends of the arched axle and the gear casings 31, 32 are just alike except that they are rights and lefts; hence only the one shown in Fig. 4 will be described in detail, it being understood that the other end is of the same construction. The casing 31 is formed in two parts bolted or riveted together and at its upper end has a laterally projecting sleeve 57 secured by rivets to the strut 55 and at its lower end has a laterally extending hollow trunnion 58 within which the axle 59 of the traction wheel 33 is rotatably mounted on roller bearings 60, 61. The inner end of the axle 59 is splined and has secured thereon a gear 62 meshing with a pinion 63 mounted on the differential shaft 64 journaled in the hollow axle. The differential shaft 64 projects beyond the casing 31 and carries the brake drum 50 previously referred to. The inner end of the differential shaft 64 carries a bevel gear 65 forming part of the usual differential. The differential gears are carried by a cage 66 within the bull gear 67 which meshes with a wide faced pinion 68 splined on a shaft 69 between two bevel gears 70, 71 (Fig. 5). The shaft 69 is mounted in a bearing 72 in one wall of the casing 39 beyond which it projects and has secured at its outer end a drum 73 forming one element of a band brake for controlling the tractor. The inner end of the shaft 69 is journaled in a recess in the bevel gear 71 which has a short shaft 74 formed integral therewith and supported in a bearing cage in the opposite wall of the casing 39. The shaft 74 extends beyond the casing and carries a belt pulley 75 for transmitting power to a machine to be driven from the tractor.

Referring to Figs. 3, 5, 10 and 11, the bevel gears 70 and 71 mesh with opposite sides of a bevel gear 76 formed integral with the transmission spline shaft 77. The pinion 68 has a groove engaged by a forked shipper arm 78 rotatably mounted on a shifter bar 79 but held against longitudinal movement thereon. The bar 79 is rotatably and slidably mounted in bearings 80, 81 of the casing 39 and one end projecting beyond the casing is secured to the lower end of the gear shifter lever 82. The lever 82 has a ball 83 intermediate its ends slidably engaging between a pair of arcuate guides 84. It will be seen that the lever 82 is shiftable both to the right and left and forward and reverse. The bar 79 has rigidly secured thereto an arm 85 the lower end of which engages a shipper rod 86 carrying a fork 87 engaging the gear 88 splined on the shaft 77. Referring to Fig. 5, it will be noted that the pinion 68 has a clutch element formed on each end adapted to cooperate with corresponding clutch elements provided on the bevel gears 70 and 71. When the pinion 68 occupies the position shown in Fig. 5, it is out of engagement with both bevel gears and the tractor is stationary. If now the lever 82 be shifted to either the right or left in Fig. 5, the clutch element on one end of the pinion 68 will engage with the corresponding clutch element on one of the bevel gears and will be rotated in the same direction that the bevel gear is being driven. If now the lever 82 be shifted either forward or reverse, the arm 85 will be oscillated with the bar 79 and the gear 88 will be moved into engagement with the gear 89 for low speed drive of the tractor or clutched to the gear 90 for high speed drive of the tractor. It will thus be seen that the tractor has two speeds forward and the same number of speeds reverse. The transmission and differential gearing just described are substantially the same as shown in the co-pending application above referred to and per se form no part of the present invention except as they cooperate generally with the other parts of the tractor to form a complete operative device.

The gear 89 is rotatably mounted on a shaft 91 rigidly secured in the lower part of the casing 39 and is formed integral with a gear 92 which meshes with the gear 90, the gear 90 being rigid with a short shaft 92′ which is driven at engine speed through the usual clutch mechanism contained in the housing 39.

A small casing 93 is bolted over an aperture in the bottom of the casing 39 adjacent the gear 89 and has rotatably mounted therein an implement drive shaft 94 from which power is taken to drive an implement such as a mower or binder being operated by the tractor. A gear 95 splined on the shaft 94 is shiftable by an arm 96 into and out of engagement with the gear 89 for controlling rotation of the shaft 94. The arm 96 is shifted by means of a short lever secured to the shaft 97 exterior to the casing 93, the lever not being shown in the drawing since it forms no part of the present invention and, together with the other means for controlling the shaft 94, is similar to the same elements in the co-pending application.

Referring to Figs. 5, 10 and 11, the drum 73 is encircled by a band 98 one end of which is connected to the short arm of a brake lever 99 pivotally mounted on a sleeve 100 in which the bar 79 slides and oscillates. The other end of the band 98 is engaged by a link 101 secured to the long arm of the brake lever. The brake lever carries a detent 102 cooperating with a toothed sector 103 for holding the brake lever in different positions of adjustment. The frame structure and arrangement of parts so far described provides an elevated arched axle structure adapted to span two plant rows, with the body of the tractor, comprising the power plant, etc., contained in depending housings which are arranged on the central median line of the tractor in alignment with the steering truck and in a position corresponding to the space between the plant rows spanned by the tractor wheels. As the housings extend below the level of the axis of the traction wheels, a low center of gravity for the tractor is obtained without reducing the effective height of the frame.

Referring to Figs. 1, 2 and 4, each of the frame members 21, 22 carries a depending bracket 104, 105 to which the converging ends 106, 107 of a supplemental or implement carrying frame are pivotally connected. The arms 106, 107 diverge outwardly from the brackets 104, 105 and then extend parallel between the casings 31, 32 where their other ends are connected by a cross beam 108 and are adapted to be connected to any one of a plurality of agricultural implements which are to be propelled by the tractor. The supplemental frame is adapted to be raised and lowered about its pivotal connection to the main frame and at each side carries a roller 109 adapted to cooperate with a vertical guide 110 formed on each of the casings 31, 32 (Figs. 1 and 4). A pair of cables 111, 112 are secured to the free end of the supplemental frame and pass over sheaves 113, 114 carried by the casings 31, 32 and are wound on drums 115, 116 secured to an implement adjusting shaft 117 mounted in bearings secured to the frame members 21, 22, 29 and 30. It will be apparent that rotation of the shaft 117 in one direction will wind the cables on the drums and raise the free end of the supplemental frame together with the implement carried thereby, while rotation of the shaft in the opposite direction will unwind the cables from the drums and lower the implement.

It will also be apparent that the location of the supplemental frame with respect to the implement drive shaft 94 is such that the free end of the frame has a range of adjustment extending above and below the horizontal plane on which shaft 94 lies, as best seen from Figure 1, and direct drive to implements carried by the supplemental frame is made possible.

Attention is now invited to Figs. 2, 3 and 6 for a detail description of the means for driving the implement adjusting shaft. A casing 118 mounted on the casing 39 provides a housing for a worm wheel 119 keyed to the shaft 117. A short shaft 120 journaled in the casing carries a worm 121 meshing with the worm wheel 119. The shaft 120 extends beyond the casing 118 and has a casing 122 mounted to oscillate thereon. Within the casing 122 are two parallel shafts 123 and 124 carrying a pair of spur gears 125, 126, the gear 125 meshing with the gear 127 secured to the shaft 120 while the gear 126 meshes with a pinion 128 which in turn meshes with the gear 127. The shafts 123 and 124 project beyond the casing 122 where they carry friction drive wheels 129 and 130 respectively, which friction wheels are adapted to engage opposite sides of a friction drive wheel 131 splined to the drive shaft 92'. A lever 132 is mounted on a bracket 133 secured to the frame member 22 and has an off-set end connected by an adjustable link 134 to an arm 135 projecting laterally from the casing 122. The lever 132 has a detent 136 adapted to normally hold it in central position with both friction wheels 129, 130 out of engagement with the drive wheel 131.

Referring now to Figs. 1 and 6, it will be apparent that movement to the right in Fig. 1 will move the arm 135 downward and the wheel 129 into engagement with the drive wheel 121 which will rotate the gears 125 and 127 and the shaft 117 in one direction while opposite movement of the levers 132 will oscillate the casing so as to shift the wheel 130 into engagement with the drive wheel 131 and, through the gearing, rotate the shaft 117 in the opposite direction. This provides a very efficient and convenient means for raising and lowering the implement carrying frame and permits accurate adjustment thereof since the shaft 117 will be rotated only while the operator on the tractor is holding the lever 132 so as to keep one pair of the friction drive wheels in contact and will stop at any point at which the operator releases his pressure on the lever 132. It will be noted that the shaft 117 is selflocking in any position through the worm gearing 119, 121.

Returning to Fig. 3, the drive shaft 92' carrying the friction drive wheel 131 has a head slidably engaging a corresponding head 137 formed on the end of the clutch shaft 138 which is driven by means of the multiple disk clutch 139 mounted in the fly wheel 140 secured to the engine crank shaft 141.

Attention is now directed to Figs. 1, 7, 8 and 9 for a description of the reversible steering mechanism. The bracket 28 extends outwardly and upwardly from the axle and at its upper end is provided with a casing 142 on which is mounted the vertical steering post 143. A shaft 144 mounted in the steering post carries the hand wheel 46 at its upper end and a bevel gear 145 at its lower end meshing with a pair of bevel gears 146 and 147 rotatably mounted on the shaft 148. Between the gears 146 and 147 is a two-way clutch 149 splined on the shaft 148 and adapted to be shifted by means of a lever 150 into engagement with either the gear 146 or 147, the lever being secured in either position of adjustment by a set screw 151. Referring to Fig. 1, the shaft 148 is connected by a coupling sleeve 152 to the horizontal steering shaft 45. Near its lower end the seat post 143 has a frusto-conical portion which is engaged by a corresponding bore in a collar 153 to which the operator's seat 154 is secured. It will be observed that by means of this construction the operator's seat may, by turning the collar 153 relative to the post 143, be made to occupy any desired position with relation to the steering wheel 146.

It has been found desirable in a reversible tractor to not only correlate the operator's seat and steering wheel so that the direction of rotation of the steering wheel will be the same with respect to the operator in either direction of operation of the tractor, but to also correlate the clutch operating mechanism with the other reversible elements so that its operation will be effected by the same relative movement in either direction of operation of the tractor. This I have accomplished in the present instance by providing a reversible clutch pedal and mounting it on the steering post so that it may be moved about its pivotal connection to either side of the steering post depending on the desired direction of travel. The casing 142 has a laterally projecting bracket 155 having a trunnion 156 upon which the clutch pedal 157 is mounted. The clutch pedal is in the form of a bell crank having a long arm adapted to be engaged by the foot of the operator and a short arm connected to a link 158 (Figs. 1, 2, 8 and 12) the opposite end of which is connected to the clutch actuating arm 159. Referring to Fig. 12, it will be seen that the clutch pedal may be thrown from full line position to dotted line position and that downward movement of the free end of the pedal in either position will effect the same movement of the clutch 139.

Returning now to Figs. 1, 7 and 8, when it is desired to operate the tractor in one direction, as say toward the left in Fig. 1, the operator's seat and the clutch pedal will occupy the positions shown by full lines in that figure and the clutch element 149 will engage with the corresponding bevel gear so that rotation of the hand wheel 46 to the right will cause the tractor to turn to the right and rotation of the wheel to the left will cause the tractor to turn to the left. Conversely, when it is desired to drive the tractor in the opposite direction, that is, to the right in Fig. 1, the operator's seat will be turned to the dotted line position, the clutch pedal will be thrown over into the opposite position or that shown by dotted lines in Fig. 12 and the clutch element 149 will be shifted into engagement with the opposite bevel gear 146 or 147. After these changes have been made, the clutch pedal will be operated in the same manner relative to the operator as before to actuate the clutch and the hand wheel 46 will again be turned either to the right or left to effect a right or left hand turn of the tractor.

In Fig. 1, I have broken off the steering cable 48 since its inclusion together with the other details of the brake steering apparatus would needlessly complicate the figure which is drawn to a very small scale and for the additional reason that the brake steering mechanism per se forms no part of the present invention and is more fully described in the co-pending application referred to above.

While I have shown and described in considerable detail one specific embodiment of my improved tractor, it will of course be understood that it is but illustrative of one form which my improvements may take and that I am not to be limited thereto beyond the scope of my claims but am entitled to all modifications and variations thereof that may fall within the scope of my invention.

What I claim as new and desire to secure by Letters Patent is:

1. In a tractor, the combination of parallel frame members, a laterally extended hollow axle secured near its central portion to one end of said members, depending housings having upper portions fixed to the ends of said axle and having outwardly projecting hollow trunnions thereon located below the axle, traction wheels fixed to stub axles journaled in the trunnions, a differential shaft journaled in the axle and extending through the housings, brakes on the ends of said shaft outside each housing, drive pinions on the shaft within each housing, driving gears in mesh with said pinions and fixed on the stub axles, an engine supported between and partly below the frame members, and a steering wheel having a vertical standard journaled between the front end of the frame members.

2. In a tractor, the combination of a main frame structure comprising an axle having a depending portion at each end forming an arch, a traction wheel mounted on the outer side of each of said portions and longitudinal frame members fixed at one end to the axle and supported at the other end on steering means, clutch and transmission housings mounted between the ends of said longitudinal members adjacent the axle and depending therebelow, a horizontally extending power shaft journaled under the transmission housing having a free end projecting on a line passing between the wheels and below the axle, and a vertically adjustable supplemental frame comprising side bars extending within the arch of the axle and connected beyond the axle by a cross-bar, said side bars having parallel portions and said parallel portions and the inner sides of the depending portions of the axle being provided with interengaging parts.

3. In a tractor, the combination of a main frame structure comprising an axle casing having a depending portion at each end forming an arch, a traction wheel mounted on the outer side of each of said portions and spaced longitudinal frame members fixed at one end to the center of the casing and supported at the other end on steering means, an engine and transmission mechanism mounted between said spaced members, parts of said transmission mechanism being contained in a housing having a portion depending below the axle casing, a power shaft driven from said transmission mechanism and mounted in the depending part of the housing and having a free end extending parallel with the longitudinal frame members, and a supplemental frame comprising side bars extending within the arch of the axle and connected to the main frame structure at points on each side of the power shaft and a cross-bar connecting the ends of the side bars and located beyond the axle casing.

4. In a tractor, the combination of an axle having a depending portion at each end forming a vertical arch, a traction wheel mounted on each of said depending portions, longitudinal frame members fixed at one end to the axle and supported at the other end on steering means, an engine and transmission mechanism on the frame members, a power shaft mounted below the frame members and extending horizontally parallel thereto and driven from said transmission mechanism, said power shaft having a free end located substantially under the center of the axle, and a vertically adjustable supplemental frame having side bars engaging the depending portions of the axle and a cross-bar connecting the side arms at a point beyond the axle, said supplemental frame having a range of vertical movement sufficient to carry its cross-bar across the horizontal plane of the power shaft.

5. In a tractor of the type adapted for operation over row grown crops, the combination of an elevated frame comprising longitudinal spaced members supported at one end on a steerable truck, a transverse arch shaped upright axle structure to which the other end of said longitudinal members are secured at its middle portion, traction wheels journaled on bearings projecting from the outer sides of the depending portions of said arched axle structure, housings containing the power and transmission mechanism of the tractor mounted between said longitudinal members in the central longitudinal median line of the tractor and in alignment with the steerable truck with portions of said housings extending downwardly into the horizontal plane in which the axis of the traction wheels lie, differential drive mechanism carried by said axle structure and geared to the traction wheels, an implement drive shaft journaled on the central longitudinal line of the tractor and having a free end projecting adjacent said axle structure, and a supplemental frame having a cross bar adapted for connection to implements and located outwardly of the axle structure, said supplemental frame being connected to the tractor frame for vertical adjustment and comprising parallel arms extending within the arched axle and engaging the inner sides of the depending portions thereof, whereby two rows of growing plants may be straddled by the tractor without contact with depending parts of the tractor structure and implement driving connection.

In testimony whereof I affix my signature.

PHILO H. DANLY.